(12) United States Patent
Chen et al.

(10) Patent No.: US 10,866,653 B2
(45) Date of Patent: *Dec. 15, 2020

(54) CONVERTER AND CONVERSION METHOD FOR CONVERTING CLICK POSITION OF DISPLAY INTO LIGHT PEN SIMULATED SIGNAL FOR SEMICONDUCTOR MANUFACTURING MACHINE

(71) Applicant: Taiwan Semiconductor Manufacturing Co., Ltd., Hsinchu (TW)

(72) Inventors: Ming-Sze Chen, Hsinchu (TW); Chin-Shen Hsieh, Hsinchu (TW)

(73) Assignee: TAIWAN SEMICONDUCTOR MANUFACTURING CO., LTD, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,007

(22) Filed: Oct. 30, 2019

(65) Prior Publication Data

US 2020/0064935 A1 Feb. 27, 2020

Related U.S. Application Data

(63) Continuation of application No. 15/495,075, filed on Apr. 24, 2017, now Pat. No. 10,466,810.

(60) Provisional application No. 62/431,457, filed on Dec. 8, 2016.

(51) Int. Cl.
*G06F 3/0354* (2013.01)
*G06F 3/037* (2013.01)
*G06F 3/038* (2013.01)
*G06F 3/0488* (2013.01)
*G09G 5/391* (2006.01)

(52) U.S. Cl.
CPC .......... *G06F 3/03542* (2013.01); *G06F 3/037* (2013.01); *G06F 3/038* (2013.01); *G06F 3/03547* (2013.01); *G09G 5/391* (2013.01); *G06F 3/0488* (2013.01); *G09G 2354/00* (2013.01); *G09G 2360/02* (2013.01)

(58) Field of Classification Search
None
See application file for complete search history.

(56) References Cited

U.S. PATENT DOCUMENTS 5,179,368 A 1/1993 Lippincott
2012/0044126 A1 2/2012 Shin
(Continued)

*Primary Examiner* — Aneeta Yodichkas
(74) *Attorney, Agent, or Firm* — McClure, Qualey & Rodack, LLP

(57) ABSTRACT

Converter and conversion method for converting a click position of a flat panel display into a light pen simulated signal for a semiconductor manufacturing machine are provided. The converter includes a first connector, a second connector, and a controller. The first connector is configured to receive a first display resolution and the click position from the flat panel display. The second connector is configured to receive a synchronization signal and a second display resolution from the semiconductor manufacturing machine. The controller is configured to obtain the light pen simulated signal according to a light pen position corresponding to the click position, and to control the second connector to provide the light pen simulated signal to the semiconductor manufacturing machine according to the synchronization signal.

20 Claims, 5 Drawing Sheets

(56) References Cited

U.S. PATENT DOCUMENTS

2015/0332167 A1 11/2015 Kaushal et al.
2017/0097720 A1 4/2017 Shin et al.

CONVERTER AND CONVERSION METHOD FOR CONVERTING CLICK POSITION OF DISPLAY INTO LIGHT PEN SIMULATED SIGNAL FOR SEMICONDUCTOR MANUFACTURING MACHINE

CROSS REFERENCE TO RELATED APPLICATIONS

This Application is a Continuation of U.S. application Ser. No. 15/495,075, filed on Apr. 24, 2017, now U.S. Pat. No. 10,466,810, which claims priority of U.S. Provisional Application No. 62/431,457, filed on Dec. 8, 2016, the entirety of which is incorporated by reference herein.

BACKGROUND

In the semiconductor industry, semiconductor manufacturing machines are indispensable and expensive equipment for manufacturing a plurality of semiconductor devices. In the manufacturing process of semiconductor devices, an operator needs to control various operations of the semiconductor manufacturing machine or input data through a graphical user interface (GUI) of the semiconductor manufacturing machine.

Semiconductor manufacturing equipment suppliers may provide their own user interfaces. For example, light pens have been used for many years with cathode-ray-tube (CRT) monitors to input data to the semiconductor manufacturing machines. This type of user interface provides a means for users to enter information into the semiconductor manufacturing machine without requiring the use of a mouse, a keyboard, or another data-entry device.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
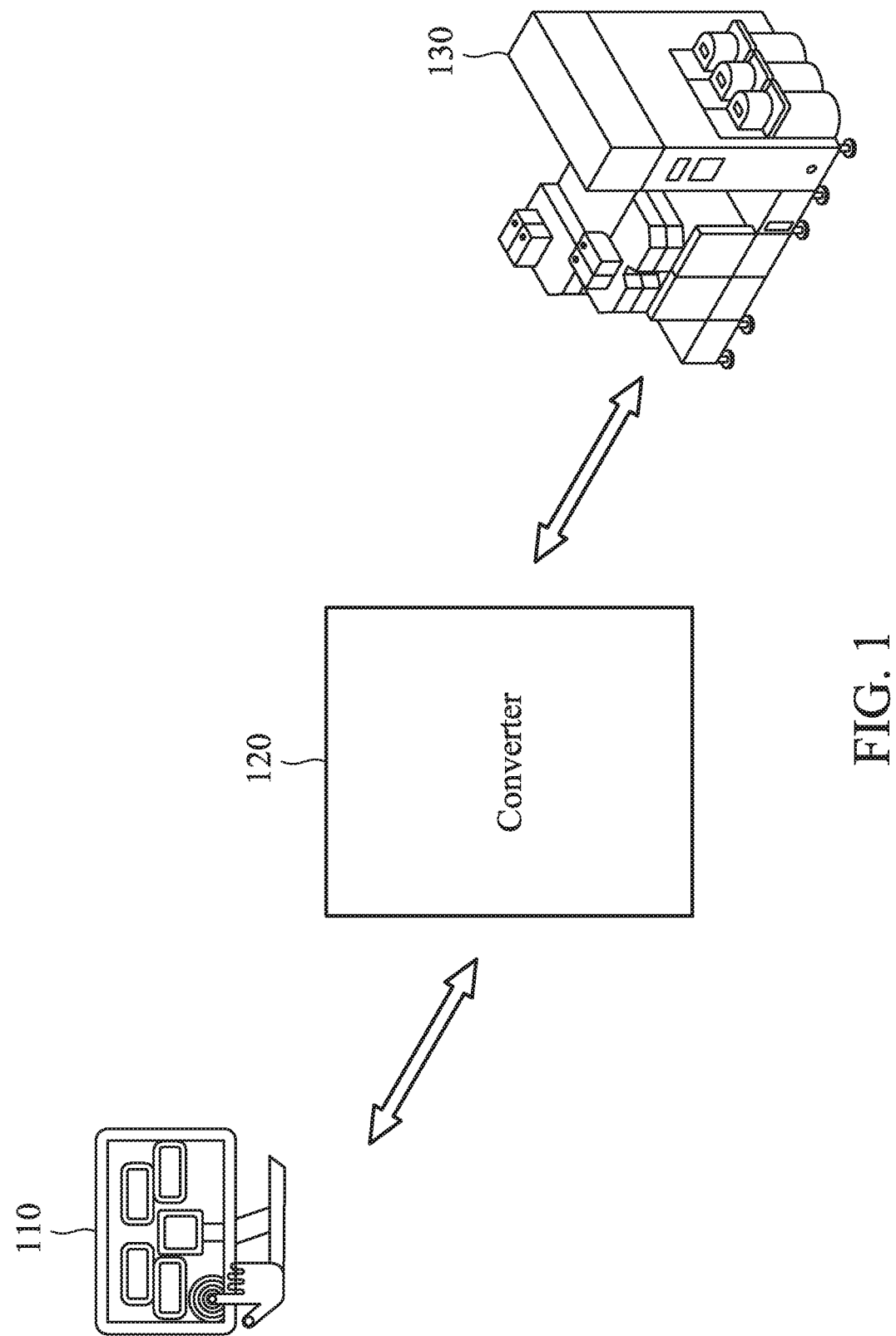
FIG. 1 shows a semiconductor manufacturing system, in accordance with some embodiments of the disclosure.

The following disclosure provides many different embodiments, or examples, for implementing different features of the subject matter provided. Specific examples of components and arrangements are described below to simplify the present disclosure. These are, of course, merely examples and are not intended to be limiting. In some embodiments, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

FIG. 1 shows a semiconductor manufacturing system 100, in accordance with some embodiments of the disclosure. The semiconductor manufacturing system 100 includes a display apparatus 110, a converter 120, and a semiconductor manufacturing machine 130.

The display apparatus 110 includes a flat panel monitor for displaying a graphical user interface (GUI) of the semiconductor manufacturing machine 130. In some embodiments, the flat panel monitor is a liquid-crystal display (LCD), a light-emitting diode (LED) display, an organic light-emitting diode (OLED) display, a thin film transistor (TFT) display or a plasma display with a touch screen. Users can click a specific option (or icon) of the GUI displayed on a display screen of the display apparatus 110, and then the display apparatus 110 can provide click information to the converter 120.

In FIG. 1, the semiconductor manufacturing machine 130 is an old-generation machine capable of manufacturing 6-inch or 8-inch wafers. Typically, users can control various operations of an old-generation machine through a cathode ray tube (CRT) monitor and a light pen. In some embodiments, a light pen is an input device for the semiconductor manufacturing machine 130. The light pen includes a light sensor for detecting light emitted from a CRT monitor coupled to the semiconductor manufacturing machine 130. The scan time of the electron beam inside the CRT monitor from a starting point of the electron beam on a display screen of the CRT monitor is measured until the light sensor of the light pen detects the light caused by the electron beam. Thus, the horizontal and vertical positions of the light pen on the display screen may be calculated according to the scan time. According to the light pen location on the display screen of the CRT monitor, the semiconductor manufacturing machine 130 can perform an operation corresponding to the light pen location.

At present, flat panel monitors are more popular than CRT monitors due to problems with CRT monitors such as a short-lifespan, a lack of brightness, abnormal RGB color, a high current draw, and so on. Furthermore, a CRT monitor and light pen are more expensive today than a flat panel monitor.

The converter 120 is coupled to the display apparatus 110 and the semiconductor manufacturing machine 130 in a wired manner. In some embodiments, the converter 120 is coupled to the display apparatus 110 through a first cable supporting the RS232 serial port standard and a second cable supporting the video graphics array (VGA) standard (e.g. a D-subminiature (D-sub) cable). Furthermore, the converter 120 is coupled to the semiconductor manufacturing machine 130 through a third cable supporting the VGA standard (e.g. a D-sub cable). The converter 120 is capable of providing a light pen simulated signal to the semiconductor manufacturing machine 130 according to the click information from the display apparatus 110, so as to control the operation of the semiconductor manufacturing machine 130 without using a CRT monitor and a light pen.

In some embodiments, the display apparatus 110 and the converter 120 can be implemented in an electronic device, such as a notebook PC.

Figure 2:
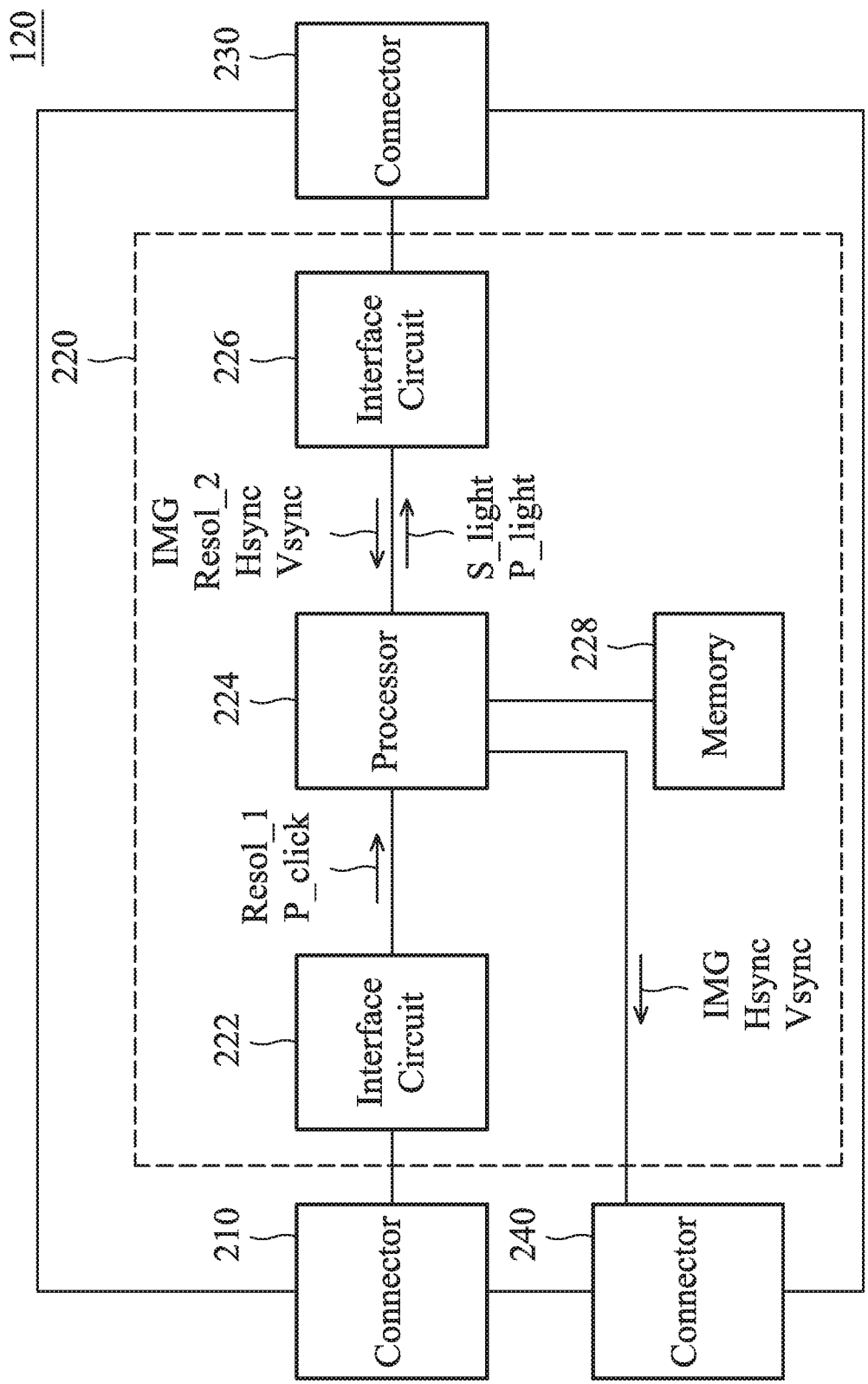
FIG. 2 shows the converter of FIG. 1, in accordance with some embodiments of the disclosure.

FIG. 2 shows the converter 120 of FIG. 1, in accordance with some embodiments of the disclosure. The converter 120 includes a connector 210, a controller 220, a connector 230, and a connector 240.

Referring to FIG. 1 and FIG. 2 together, the connectors 210 and 230 are different types of connectors, and the connectors 230 and 240 are the same type of connectors. The connector 210 is an RS232 connector, and the converter 120 is coupled to the display apparatus 110 of FIG. 1 through the connector 210 and an RS232 cable. The connector 230 is a D-sub connector, and the converter 120 is coupled to the semiconductor manufacturing machine 130 of FIG. 1 through the connector 230 and a D-sub cable. Moreover, the connector 240 is a D-sub connector, and the converter 120 is coupled to the display apparatus 110 of FIG. 1 through the connector 240 and a D-sub cable. In some embodiments, the connector 230 is a 25-pin D-sub connector, and the connector 240 is a 15-pin D-sub connector.

In some embodiments, the display apparatus 110 of FIG. 1 is a display module formed by a display without a touch screen and a touch panel that are independent of each other. The converter 120 is coupled to the display without a touch screen via the connector 240. Furthermore, the converter 120 is coupled to the touch panel via the connector 210.

The controller 220 includes an interface circuit 222, a processor 224, an interface circuit 226, and a memory 228. In some embodiments, the controller 220 is implemented in a field programmable gate array (FPGA) or an integrated circuit.

The interface circuit 222 is coupled between the connector 210 and the processor 224. When the connector 210 is coupled to the display apparatus 110, the interface circuit 222 is capable of communicating with the display apparatus 110 through the connector 210, e.g. the interface circuit 222 can transmit and receive signals conforming to the RS232 standard.

The interface circuit 226 is coupled between the connector 230 and the processor 224. When the connector 230 is coupled to the semiconductor manufacturing machine 130, the interface circuit 226 is capable of transferring signals conforming to the VGA standard. In the embodiment, the processor 224 can obtain a horizontal synchronization signal Hsync, a vertical synchronization signal Vsync and image data IMG corresponding to a graphical user interface (GUI) of the semiconductor manufacturing machine 130 through the connector 230 and the interface circuit 226. Furthermore, the processor 224 obtains the display resolution Resol_2 of the semiconductor manufacturing machine 130. In some embodiments, the display resolution Resol_2 is obtained from the semiconductor manufacturing machine 130 through the connector 230 and the interface circuit 226. In some embodiments, the display resolution Resol_2 is stored in the memory 228 in advance.

When obtaining the horizontal synchronization signal Hsync, the vertical synchronization signal Vsync and the image data IMG, the processor 224 can provide the horizontal synchronization signal Hsync, the vertical synchronization signal Vsync and the image data IMG to the display apparatus 110 through the connector 240. When receiving the horizontal synchronization signal Hsync, the vertical synchronization signal Vsync and the image data IMG, the display apparatus 110 is capable of displaying the GUI of the semiconductor manufacturing machine 130 on the display screen of the display apparatus 110 according to the display resolution Resol_1. In some embodiments, the processor 224 is capable of modifying the horizontal synchronization signal Hsync, the vertical synchronization signal Vsync and the image data IMG to match the display resolution Resol_1 of the display apparatus 110.

When a user clicks the GUI displayed on the display screen of the display apparatus 110, the interface circuit 222 can obtain a click position P_click from the display apparatus 110, and provides the click position P_click to the processor 224. In some embodiments, the click position P_click includes a first horizontal coordinate X1 and a first vertical coordinate Y1 of the display screen of the display apparatus 110. Furthermore, the processor 224 obtains the display resolution Resol_1 of the display apparatus 110. In some embodiments, the display resolution Resol_1 is obtained from the display apparatus 110. In some embodiments, the display resolution Resol_1 is stored in the memory 228 in advance.

When obtaining the display resolution Resol_1 of the display apparatus 110 and the display resolution Resol_2 of the semiconductor manufacturing machine 130, the processor 224 can obtain a mapping table between the display resolution Resol_1 of the display apparatus 110 and the display resolution Resol_2 of the semiconductor manufacturing machine 130. In general, the display resolution of a flat panel display is greater than that of a CRT monitor.

Figure 3:
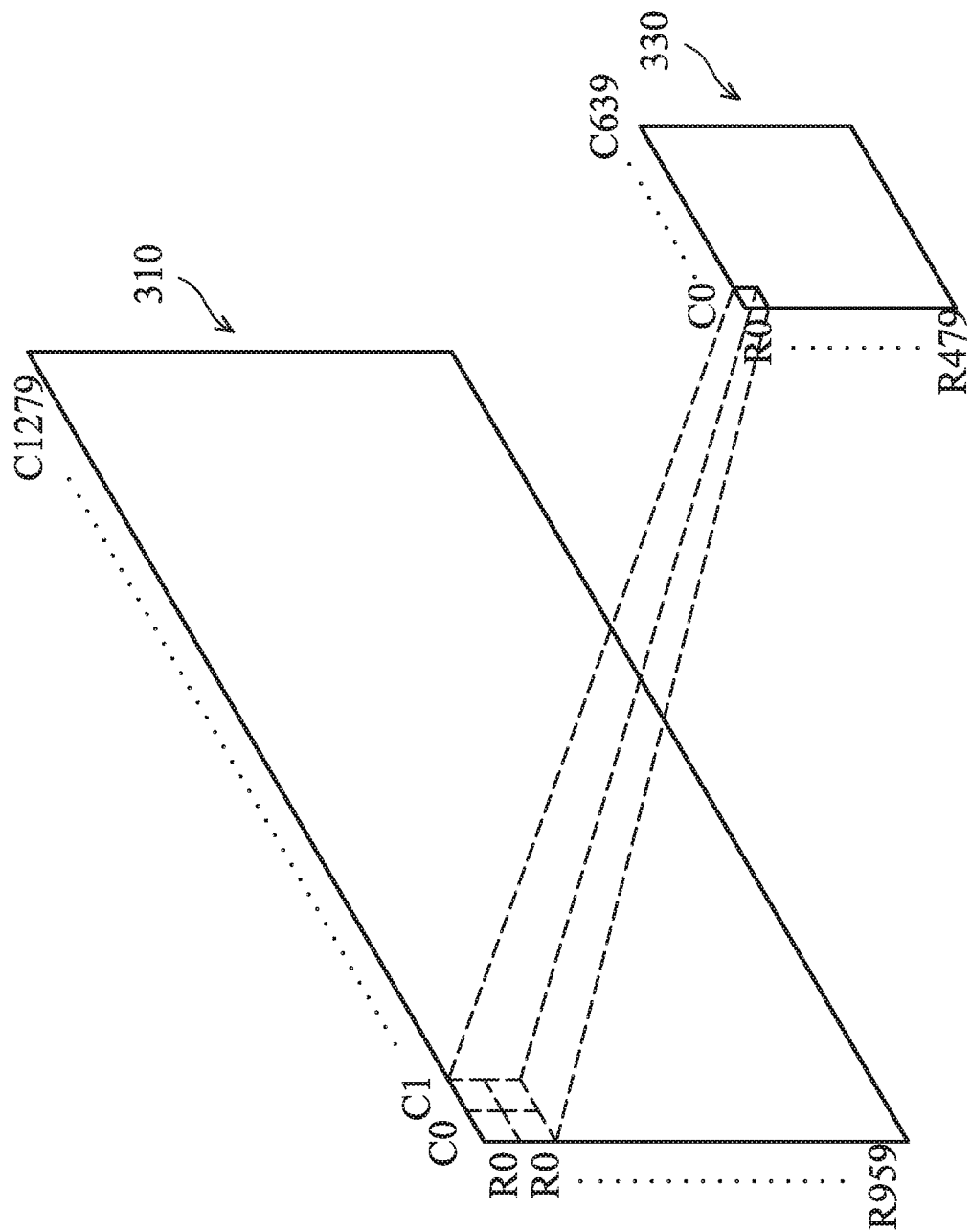
FIG. 3 shows a schematic illustrating a mapping relationship between a first display resolution 1280×960 of a display apparatus and a second display resolution 640×480 of a semiconductor manufacturing machine.

Referring to FIG. 3, FIG. 3 shows a schematic illustrating a mapping relationship between a first display resolution 1280×960 of a display apparatus 310 (e.g. 110 of FIG. 1) and a second display resolution 640×480 of a semiconductor manufacturing machine 330 (e.g. 130 of FIG. 1). In FIG. 3, the display screen of the display apparatus 310 is formed by a plurality of pixels, and the pixels are arranged in an array formed by 960 rows R0-R959 and 1280 columns C0-C1279. Furthermore, the display screen of a CRT monitor corresponding to the semiconductor manufacturing machine 330 is formed by a plurality of pixels, and the pixels are arranged in an array formed by 480 rows R0-R479 and 640 columns C0-C639. In the embodiment, the display screen of the display apparatus 310 is twice the length and width of the display screen corresponding to the semiconductor manufacturing machine 330. Therefore, a click position P_click located at pixel (R0,C0), (R0,C1), (R1,C0) or (R1,C1) of the display screen of the display apparatus 310 will be converted into a light pen position located at pixel (R0,C0) of the display screen corresponding to the semiconductor manufacturing machine 330.

Referring back to FIG. 1 and FIG. 2 together, in some embodiments, a mapping relationship between the display resolution Resol_1 of the display apparatus 110 and the display resolution Resol_2 of the semiconductor manufacturing machine 130 is calculated by the processor 224 after obtaining the display resolutions Resol_1 and Resol_2, so as to obtain a mapping table of the display resolutions Resol_1 and Resol_2. If the display resolution Resol_1 or Resol_2 is changed, the processor 224 will update the mapping relationship, so as to obtain a new mapping table.

In some embodiments, various mapping tables are stored in the memory 228 in advance. After obtaining the display resolutions Resol_1 and Resol_2, the processor 224 can read a mapping table of the display resolutions Resol_1 and Resol_2 from the memory 228. If the display resolution Resol_1 or Resol_2 is changed, the processor 224 will read the memory 228 to obtain a new mapping table of the changed display resolutions Resol_1 and Resol_2.

After obtaining the click position P_click from the display apparatus 110, the processor 224 can convert the click position P_click into a light pen position P_light according to the mapping table corresponding to a mapping relationship between the display resolution Resol_1 of the display apparatus 110 and the display resolution Resol_2 of the semiconductor manufacturing machine 130. The light pen position P_light is used to simulate a position where a change of brightness of the screen of a CRT monitor is detected by a sensor of a light pen when the CRT monitor is scanned by an electron beam according to the horizontal synchronization signal Hsync and the vertical synchronization signal Vsync. In some embodiments, the light pen position P_light includes a second horizontal coordinate X2 and a second vertical coordinate Y2 of the display screen of the CRT monitor.

For example, assigning the display resolution Resol_1 to be equal to 1980×1950 and the display resolution Resol_2 to be equal to 640×480, the processor 224 can obtain a mapping table of the display resolutions Resol_1 and Resol_2. If the click position P_click is located at a set of coordinates (250, 550), i.e. X1=250 and Y1=550, the processor 224 can convert the coordinates (250, 550) of the click position P_click into the coordinates (80, 135) of the light pen position P_light according to the mapping table), i.e. X2=80 and Y2=135.

After obtaining the light pen position P_light, the processor 224 calculates or counts a specific time period TP corresponding to the light pen position P_light according to the vertical synchronization signal Vsync, the horizontal synchronization signal Hsync, and a scan clock scan_clock. In some embodiments, the scan clock scan_clock is provided by the semiconductor manufacturing machine 130. In some embodiments, the scan clock scan_clock is internally generated by the controller 220 according to the vertical synchronization signal Vsync and the horizontal synchronization signal Hsync.

After the specific time period TP corresponding to the light pen position is reached, the processor 224 provides a light pen simulated signal S_light with a specific pulse width (about 200 µs) to the semiconductor manufacturing machine 130.

After obtaining the light pen simulated signal S_light from the converter 120, the semiconductor manufacturing machine 130 can perform an operation corresponding to the specific option of the GUI. As described above, the GUI is displayed on the display screen of the display apparatus 110, and after the specific option of the GUI is clicked, the display apparatus 110 will provide the click position P_click to the converter 120.

If the semiconductor manufacturing machine 130 obtains the light pen simulated signal S_light and then performs another operation other than the operation corresponding to the specific option of the GUI, a calibration procedure can be performed through a user input interface (not shown) of the converter 120 or a calibration signal from the display apparatus 110. In the calibration procedure, the mapping table of the display resolutions Resol_1 and Resol_2 is modified by adding an offset value.

Taking FIG. 3 as an example, by compensating for a horizontal offset (e.g. one row), a click position P_click located at pixel (R1,C0), (R1,C1), (R2,C0) or (R2,C1) of the display screen of the display apparatus 310 will be converted into a light pen position located at pixel (R0,C0) of the display screen corresponding to the semiconductor manufacturing machine 330. Conversely, by compensating for a vertical offset (e.g. one column), a click position P_click located at pixel (R0,C1), (R0,C2), (R1,C1) or (R1,C2) of the display screen of the display apparatus 310 will be converted into a light pen position located at pixel (R0,C0) of the display screen corresponding to the semiconductor manufacturing machine 330.

Figure 4:
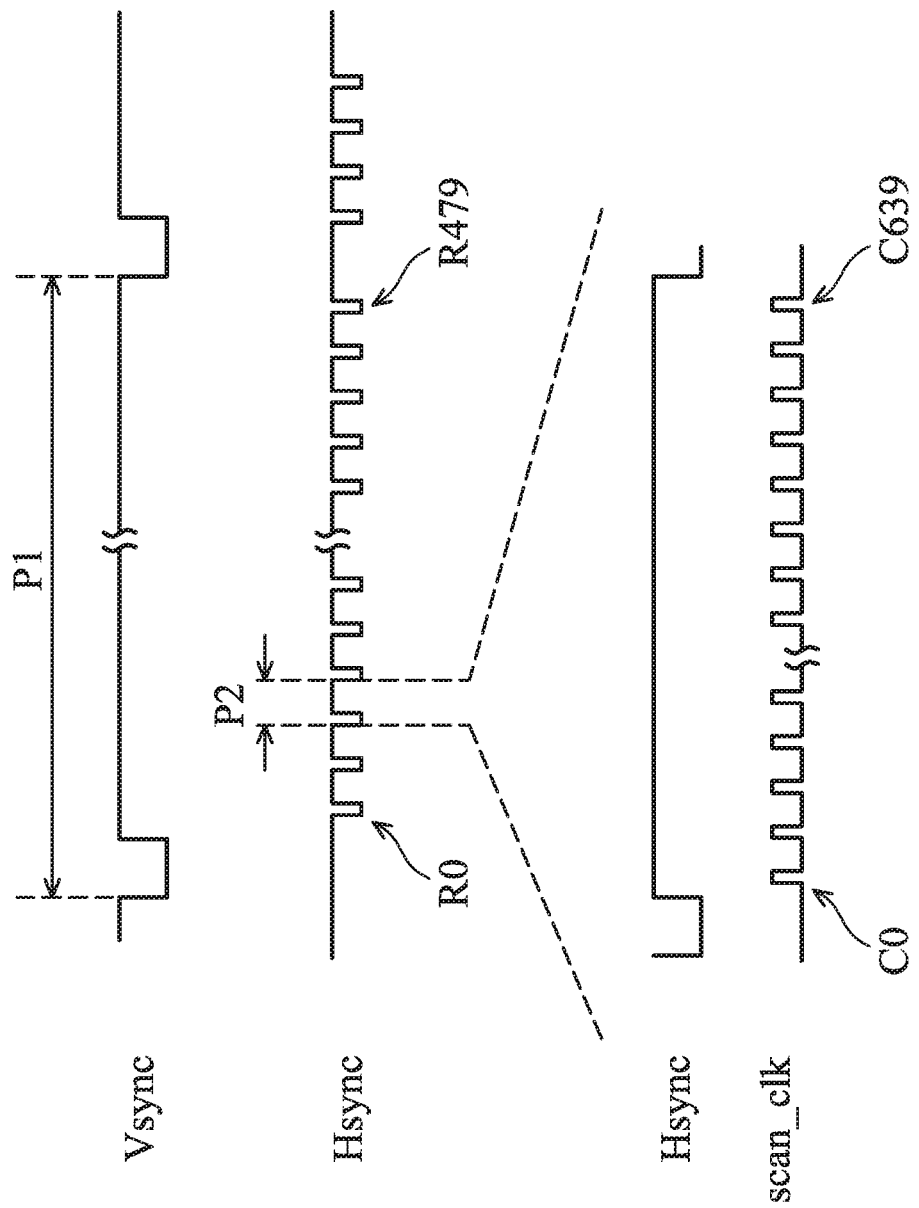
FIG. 4 shows a waveform illustrating a horizontal synchronization signal Hsync and a vertical synchronization signal Vsync provided by a semiconductor manufacturing machine, in accordance with some embodiments of the disclosure.

FIG. 4 shows a waveform illustrating a horizontal synchronization signal Hsync and a vertical synchronization signal Vsync provided by a semiconductor manufacturing machine (e.g. 130 of FIG. 1), in accordance with some embodiments of the disclosure. Both the horizontal synchronization signal Hsync and the vertical synchronization signal Vsync provided by the semiconductor manufacturing machine are needed to create a fully stable picture in a display monitor of a display. It should be noted that the waveforms of the signals in FIG. 4 are used as an example, and not to limit the disclosure.

The vertical synchronization signal Vsync is a pulse transmitted at the beginning of each frame period P1. In response to each pulse of the vertical synchronization signal Vsync, a monitor will start displaying a new image or frame, and the monitor starts in the upper left corner of the display screen.

The horizontal synchronization signal Hsync is a pulse at the beginning of each video line (e.g. each row) which keeps the horizontal scanning of the monitor exactly in step with the transmission of each new line. In response to each pulse of the horizontal synchronization signal Hsync, the monitor will refresh the pixels or dots of the same row corresponding to the pulse in each scan period P2.

In FIG. 4, when the vertical synchronization signal Vsync changes from a high logic level to a low logic level, the display screen of the monitor will start refreshing to display a frame of an image or a picture. During each frame period P1, 480 pulses of the horizontal synchronization signal Hsync are used to scan the rows R0-R479 of the display screen. Furthermore, during each scan period P2, 640 pulses of the scan clock scan_clock are used to scan the pixels of columns C0-C639 in the same row, respectively.

As described above, according to the horizontal synchronization signal Hsync, the vertical synchronization signal Vsync and the scan clock scan_clock, a specific time period TP corresponding to the light pen position P_light is counted by a processor (e.g. 224 of FIG. 2) of the converter. For example, assuming that the light pen position P_light is at coordinates (80, 135), and the processor starts to count the specific time period TP after the vertical synchronization signal Vsync changes from a low logic level to a high logic level. After counting that 135 pulses of the horizontal synchronization signal Hsync and 80 pulses of the scan clock scan_clock have been passed, the processor determines that the specific time period TP is reached, and then the processor provides the light pen simulated signal S_light with a pulse width of 200 µs to the semiconductor manufacturing machine.

Figure 5:
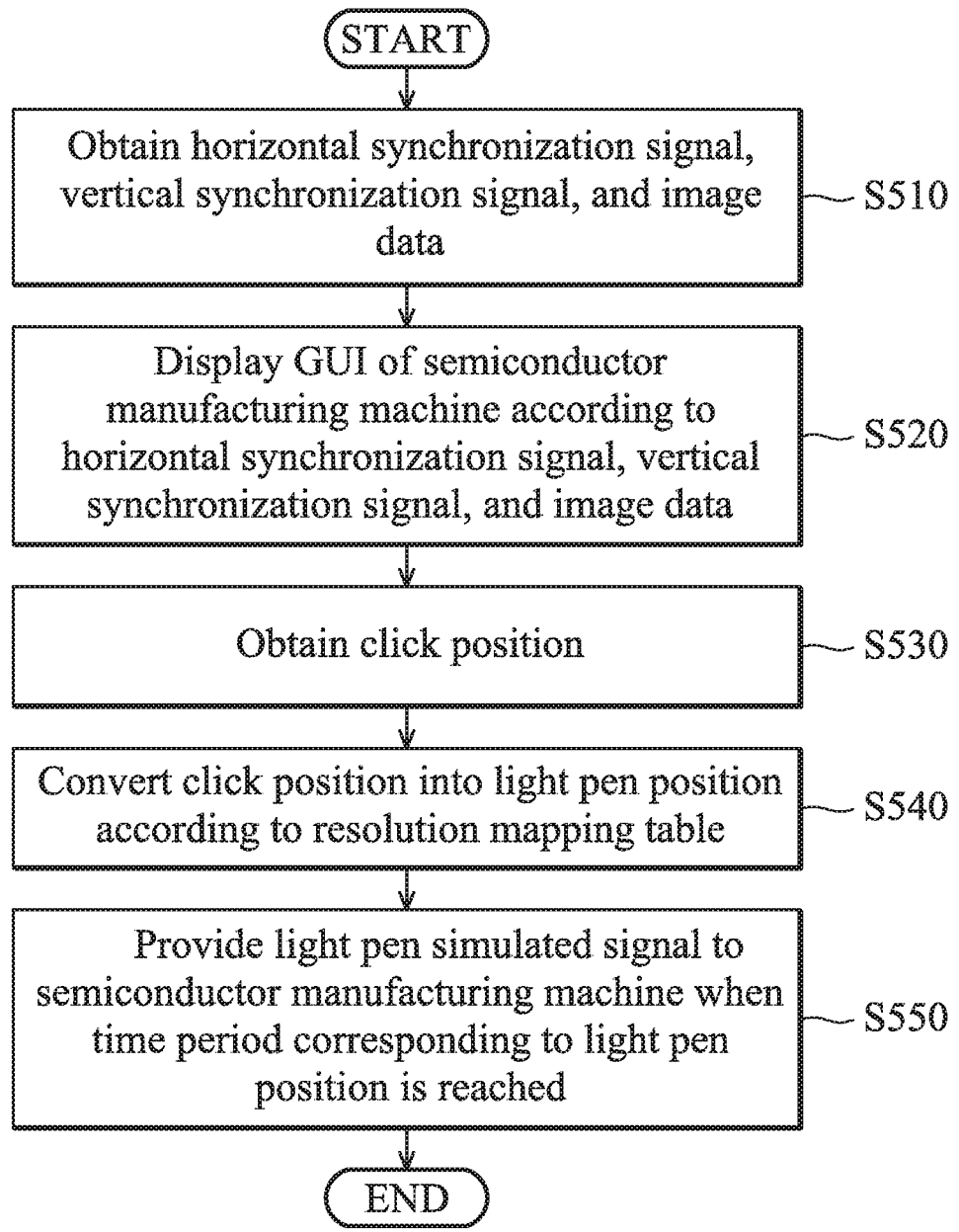
FIG. 5 shows a conversion method for converting a click position of a display into a light pen simulated signal for a semiconductor manufacturing machine, in accordance with some embodiments of the disclosure.

FIG. 5 shows a conversion method for converting a click position of a display into a light pen simulated signal for a semiconductor manufacturing machine (e.g. 130 of FIG. 1), in accordance with some embodiments of the disclosure.

In operation S510, a converter (e.g. 120 of FIG. 1) obtains a horizontal synchronization signal Hsync, a vertical synchronization signal Vsync, and image data IMG corresponding to a GUI of the semiconductor manufacturing machine through a first D-sub connector (e.g. 230 of FIG. 2) of the converter.

In operation S520, the converter provides the horizontal synchronization signal Hsync, the vertical synchronization signal Vsync, and the image data IMG to a display apparatus (e.g. 110 of FIG. 1) through a second D-sub connector (e.g. 240 of FIG. 2) of the converter, so as to display the GUI on a display screen of the display apparatus.

In operation S530, when a specific option of the GUI displayed on the display screen of the display apparatus is clicked, the converter obtains a click position P_click from the display apparatus.

In operation S540, the converter converts the click position P_click into a light pen position P_light according to a display resolution Resol_1 of the display apparatus and a display resolution Resol_2 of the semiconductor manufacturing machine. As described above, a mapping table of the display resolutions Resol_1 and Resol_2 is used to obtain the light pen position P_light. When the display resolution Resol_1 or Resol_2 is changed, the converter will update the mapping table. The light pen position P_light is used to simulate a position where a change of brightness of the screen of a CRT monitor is detected by a sensor of a light pen when the CRT monitor is scanned by an electron beam according to the horizontal synchronization signal Hsync and the vertical synchronization signal Vsync.

In operation S550, in response to the vertical synchronization signal Vsync and the horizontal synchronization signal Hsync, the converter counts a specific time period TP according to the light pen position P_light. When the specific time period TP is reached, the converter provides a light pen simulated signal S_light with a specific pulse width to the semiconductor manufacturing machine.

After obtaining the light pen simulated signal S_light from the converter, the semiconductor manufacturing machine can perform an operation corresponding to the specific option of the GUI, so as to manufacture semiconductor devices.

Embodiments for converters and conversion methods for converting a click position of a display into a light pen simulated signal for a semiconductor manufacturing machine are provided. When a specific option of the GUI displayed on a display screen of a flat panel display is clicked, a click position P_click is obtained through an RS232 connector. According to a mapping table of a display resolution Resol_1 of the flat panel display and a display resolution Resol_2 of the semiconductor manufacturing machine, the click position P_click is converted into a light pen position P_light. The light pen position P_light represents a simulated position where a change of brightness of the screen of a CRT monitor is detected by a sensor of a light pen when the CRT monitor is scanned by an electron beam according to a horizontal synchronization signal Hsync and a vertical synchronization signal Vsync from the semiconductor manufacturing machine. A light pen simulated signal S_light with a specific pulse width is provided to the semiconductor manufacturing machine when a specific time period TP corresponding to the light pen position P_light is reached. Thus, the semiconductor manufacturing machine can perform an operation corresponding to the specific option of the GUI, so as to manufacture semiconductor devices.

In some embodiments, a converter for converting a click position of a flat panel display into a light pen simulated signal for a semiconductor manufacturing machine is provided. The converter includes a first connector, a second connector, and a controller. The first connector is configured to receive a first display resolution and the click position from the flat panel display. The second connector is configured to receive a synchronization signal and a second display resolution from the semiconductor manufacturing machine. The controller is configured to obtain the light pen simulated signal according to a light pen position corresponding to the click position, and to control the second connector to provide the light pen simulated signal to the semiconductor manufacturing machine according to the synchronization signal.

In some embodiments, a conversion method for converting a click position of a flat panel display into a light pen simulated signal for a semiconductor manufacturing machine is provided. A light pen position corresponding to the click position is obtained from the flat panel display according to a first display resolution of the flat panel display and a second display resolution of the semiconductor manufacturing machine. The light pen simulated signal is provided to the semiconductor manufacturing machine according to the light pen position and a synchronization signal from the semiconductor manufacturing machine.

In some embodiments, a semiconductor manufacturing system is provided. The semiconductor manufacturing system includes a semiconductor manufacturing machine, a flat panel display, and a converter coupled between the semiconductor manufacturing machine and the flat panel display. The semiconductor manufacturing machine has a first display resolution. The flat panel display is configured to display a graphical user interface (GUI) of the semiconductor manufacturing machine with a second display resolution. The converter is configured to convert a click position from the flat panel display into a light pen position according to the first and second display resolutions, and to provide a light pen simulated signal to the semiconductor manufacturing machine according to the light pen position and a synchronization signal from the semiconductor manufacturing machine.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A converter for converting a click position of a flat panel display into a light pen simulated signal for a semiconductor manufacturing machine, comprising:
   a first connector, configured to receive a first display resolution and the click position from the flat panel display;

a second connector, configured to receive a synchronization signal and a second display resolution from the semiconductor manufacturing machine; and a controller, configured to obtain the light pen simulated signal according to a light pen position corresponding to the click position, and to control the second connector to provide the light pen simulated signal to the semiconductor manufacturing machine according to the synchronization signal.

2. The converter as claimed in claim 1, wherein the click position represents a position that corresponds to a first horizontal coordinate and a first vertical coordinate on a display screen of the flat panel display that has been clicked, and the controller converts the first horizontal coordinate and the first vertical coordinate into the light pen position according to a mapping table of the first and second display resolutions.

3. The converter as claimed in claim 2, wherein the light pen position represents a simulated position corresponding to a second horizontal coordinate and a second vertical coordinate on a display screen of a cathode ray tube (CRT) display.

4. The converter as claimed in claim 1, wherein the first display resolution is higher than the second display resolution.

5. The converter as claimed in claim 1, wherein in response to the synchronization signal, the controller counts a specific time period corresponding to the light pen position, and provides the light pen simulated signal to the semiconductor manufacturing machine through the second connector when the specific time period is reached.

6. The converter as claimed in claim 5, wherein a pulse width of the light pen simulated signal provided to the semiconductor manufacturing machine is 200 μs.

7. The converter as claimed in claim 1, wherein the first connector is an RS232 connector, and the second connector is a D-subminiature connector.

8. The converter as claimed in claim 1, wherein the click position indicates that a specific option of a graphical user interface of the semiconductor manufacturing machine displayed on a display screen of the flat panel display is selected, and in response to the light pen simulated signal, the semiconductor manufacturing machine performs a specific operation corresponding to the specific option to manufacture a semiconductor device.

9. A conversion method for converting a click position of a flat panel display into a light pen simulated signal for a semiconductor manufacturing machine, comprising:

obtaining a light pen position corresponding to the click position from the flat panel display according to a first display resolution of the flat panel display and a second display resolution of the semiconductor manufacturing machine; and providing the light pen simulated signal to the semiconductor manufacturing machine according to the light pen position and a synchronization signal from the semiconductor manufacturing machine.

10. The conversion method as claimed in claim 9, wherein the click position represents a position that corresponds to a first horizontal coordinate and a first vertical coordinate on a display screen of the flat panel display that has been clicked, and obtaining the light pen position corresponding to the click position from the flat panel display according to the first display resolution of the flat panel display and the second display resolution of the semiconductor manufacturing machine further comprises:

converting the first horizontal coordinate and the first vertical coordinate into the light pen position according to a mapping table of the first and second display resolutions.

11. The conversion method as claimed in claim 10, wherein the light pen position represents a simulated position corresponding to a second horizontal coordinate and a second vertical coordinate on a display screen of a cathode ray tube (CRT) display.

12. The conversion method as claimed in claim 9, wherein the first display resolution is higher than the second display resolution.

13. The conversion method as claimed in claim 9, wherein providing the light pen simulated signal to the semiconductor manufacturing machine according to the light pen position and the synchronization signal from the semiconductor manufacturing machine further comprises:

counting a specific time period corresponding to the light pen position in response to the synchronization signal; and providing the light pen simulated signal to the semiconductor manufacturing machine when the specific time period is reached.

14. The conversion method as claimed in claim 13, wherein a pulse width of the light pen simulated signal provided to the semiconductor manufacturing machine is 200 μs.

15. The conversion method as claimed in claim 9, wherein the click position is obtained through an RS232 connector, and the synchronization signal is obtained through a D-subminiature connector.

16. The conversion method as claimed in claim 9, wherein the click position indicates that a specific option of a graphical user interface of the semiconductor manufacturing machine displayed on a display screen of the flat panel display is selected, and in response to the light pen simulated signal, the semiconductor manufacturing machine performs a specific operation corresponding to the specific option to manufacture a semiconductor device.

17. A semiconductor manufacturing system, comprising:

a semiconductor manufacturing machine, having a first display resolution;

a flat panel display, configured to display a graphical user interface (GUI) of the semiconductor manufacturing machine with a second display resolution; and a converter coupled between the semiconductor manufacturing machine and the flat panel display, configured to convert a click position from the flat panel display into a light pen position according to the first and second display resolutions, and to provide a light pen simulated signal to the semiconductor manufacturing machine according to the light pen position and a synchronization signal from the semiconductor manufacturing machine.

18. The semiconductor manufacturing system as claimed in claim 17, wherein the click position represents a position that corresponds to a first horizontal coordinate and a first vertical coordinate on a display screen of the flat panel display that has been clicked, and the converter converts the first horizontal coordinate and the first vertical coordinate into the light pen position according to a mapping table of the first and second display resolutions, wherein the light pen position represents a simulated position corresponding to a second horizontal coordinate and a second vertical coordinate on a display screen of a cathode ray tube (CRT) display.

19. The semiconductor manufacturing system as claimed in claim 17, wherein in response to the synchronization signal, the converter counts a specific time period corresponding to the light pen position, and provides the light pen simulated signal to the semiconductor manufacturing machine when the specific time period is reached.

20. The semiconductor manufacturing system as claimed in claim 19, wherein the converter is coupled to the flat panel display through an RS232 connector, and the converter is coupled to the semiconductor manufacturing machine through a D-subminiature connector.

* * * * *